(12) United States Patent
Nagano

(10) Patent No.: US 8,500,267 B2
(45) Date of Patent: Aug. 6, 2013

(54) WATER-BASED INK FOR INK-JET RECORDING, INK CARTRIDGE, INK-JET RECORDING APPARATUS AND METHOD FOR PRODUCING WATER-BASED INK FOR INK-JET RECORDING

(75) Inventor: Taro Nagano, Nagoya (JP)

(73) Assignee: Brother Kogyo Kabushiki Kaisha, Nagoya-shi (JP)

( * ) Notice: Subject to any disclaimer, the term of this patent is extended or adjusted under 35 U.S.C. 154(b) by 60 days.

(21) Appl. No.: 13/209,491

(22) Filed: Aug. 15, 2011

(65) Prior Publication Data

US 2012/0081477 A1 Apr. 5, 2012

(30) Foreign Application Priority Data

Sep. 30, 2010 (JP) .................... 2010-223244

(51) Int. Cl.
*G01D 11/00* (2006.01)
(52) U.S. Cl.
USPC ........................................ 347/100

(58) Field of Classification Search
USPC ................. 347/100; 106/31.85, 31.87, 493
See application file for complete search history.

(56) References Cited

U.S. PATENT DOCUMENTS

| | | | |
|---|---|---|---|
| 6,184,268 B1 * | 2/2001 | Nichols et al. | 523/160 |
| 6,648,954 B2 * | 11/2003 | Uemura et al. | 106/31.85 |
| 2008/0241398 A1 | 10/2008 | Kato et al. | |
| 2009/0226678 A1 | 9/2009 | Yatake et al. | |
| 2009/0233064 A1 | 9/2009 | Yatake et al. | |

FOREIGN PATENT DOCUMENTS

| | | |
|---|---|---|
| JP | 2002-327138 | 11/2002 |
| JP | 2007-186641 | 7/2007 |
| JP | 2007-186642 | 7/2007 |
| JP | 2008-246821 | 10/2008 |
| JP | 2010-155959 | 7/2010 |
| JP | 2010-156089 | 7/2010 |

* cited by examiner

*Primary Examiner* — Anh T. N. Vo
(74) *Attorney, Agent, or Firm* — Banner & Witcoff, Ltd.

(57) ABSTRACT

There is provided a water-based ink for ink-jet recording including: a colorant including a self-dispersible pigment modified by a carboxylic acid group; a highly polymerized compound containing a carbodiimide group; an ether sulfate-based anionic surfactant; water; and a water-soluble organic solvent.

8 Claims, 1 Drawing Sheet

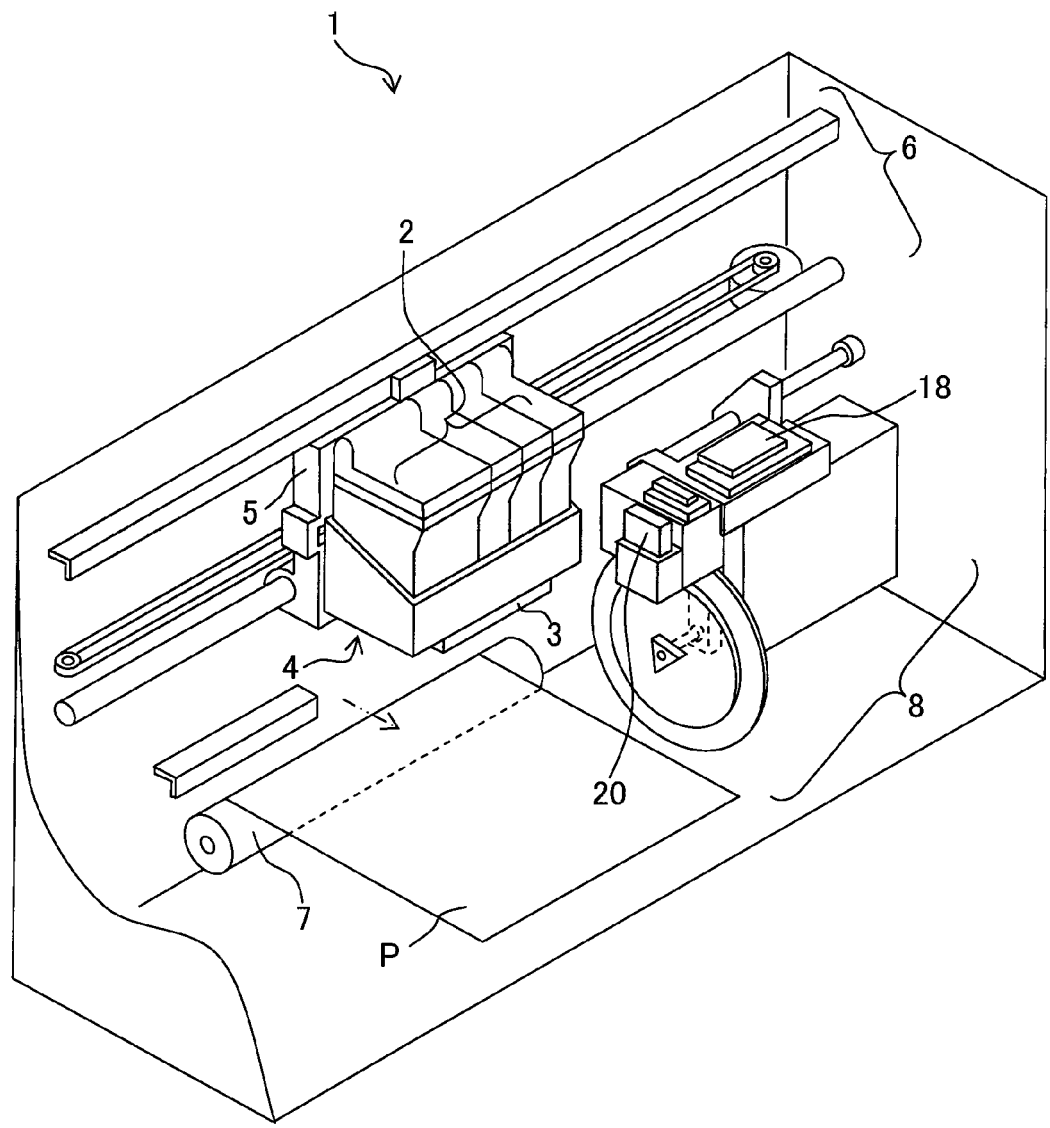

WATER-BASED INK FOR INK-JET RECORDING, INK CARTRIDGE, INK-JET RECORDING APPARATUS AND METHOD FOR PRODUCING WATER-BASED INK FOR INK-JET RECORDING

CROSS REFERENCE TO RELATED APPLICATION

The present application claims priority from Japanese Patent Application No. 2010-223244 filed on Sep. 30, 2010 the disclosure of which is incorporated herein by reference in its entirety.

BACKGROUND OF THE INVENTION

1. Field of the Invention

The present invention relates to a water-based ink for ink-jet recording, an ink cartridge, an ink-jet recording apparatus, and a method for producing a water-based ink for ink-jet recording.

2. Description of the Related Art

In the ink-jet recording, a method for using a water-soluble polymer is known as a method for enhancing fixing property of water-based pigment ink to a glossy paper.

However, a water-based pigment ink using the water-soluble polymer does not have sufficient discharge property and re-dispersion property. On the other hand, there is a method for using a pigment fixing solution containing polycarbodiimide as a technique for enhancing the fixing property of water-based pigment ink. In this method, however, it is required to use two liquids which are the water-based pigment ink and the pigment fixing solution.

In view of the above situation, an object of the present invention is to provide a water-based ink for ink-jet recording with excellent discharge property and excellent re-dispersion property and excellent fixing property to a glossy paper even without using any pigment fixing solution.

SUMMARY OF THE INVENTION

According to a first aspect of the present teaching, there is provided a water-based ink for ink-jet recording, including:
a colorant including a self-dispersible pigment modified by a carboxylic acid group;
a highly polymerized compound containing a carbodiimide group;
an ether sulfate-based anionic surfactant;
water; and
a water-soluble organic solvent.

According to a second aspect of the present teaching, there is provided an ink cartridge including a water-based ink for ink-jet recording, wherein the water-based ink for ink-jet recording is the water-based ink for ink-jet recording of the first aspect.

According to a third aspect of the present teaching, there is provided an ink-jet recording apparatus including:
an ink accommodating section which accommodates the ink cartridge of the second aspect; and
an ink discharge mechanism which discharges the ink included in the ink cartridge.

According to a fourth aspect of the present teaching, there is provided a method for producing a water-based ink for ink-jet recording which includes a colorant including a self-dispersible pigment modified by a carboxylic acid group; a highly polymerized compound containing a carbodiimide group; an ether sulfate-based anionic surfactant; water; and a water-soluble organic solvent,
the method including:
preparing a mixed liquid containing the ether sulfate-based anionic surfactant and one of the self-dispersible pigment modified by the carboxylic acid group and the highly polymerized compound containing the carbodiimide group; and
adding, to the mixed liquid, the other of the self-dispersible pigment modified by the carboxylic acid group and the highly polymerized compound containing the carbodiimide group.

BRIEF DESCRIPTION OF THE DRAWINGS

FIG. 1 is a schematic perspective view of construction of an example of an ink-jet recording apparatus of the present teaching.

DESCRIPTION OF THE PREFERRED EMBODIMENTS

In the present teaching, the term "re-dispersing property" means, for example, solubility and dispersing property of a solid matter, in a water-based ink, generated after the water-based ink is once evaporated to dryness with resultant solid matter, the solubility and dispersing property being those of when the solid matter is then newly brought into contacted with the water-based ink. If the re-dispersion property is not satisfactory, then, for example, in a case that the solid matter is generated after the water-based ink has been heated in an ink-jet head and evaporated and dried, the solid matter of the water-based ink is not dissolved and dispersed even when the solid matter is newly brought into contact with the water-based ink, thereby causing discharge failure.

In the present teaching, the term "ether sulfate-based anionic surfactant" means an anionic surfactant having an ether group and, as a hydrophilic group, a sulfate group composed of sulfate ion and counter ion.

In the following, an explanation will be given about the water-based ink for ink-jet recording (hereinafter referred to also simply as "water-based ink" or "ink") of the present teaching.

The water-based ink of the present teaching contains a colorant, water and a water-soluble organic solvent. The colorant includes a self-dispersible pigment modified by a carboxylic acid group (carboxylic acid group-modified self-dispersible pigment), as described above. It is allowable to use a commercially available product as the carboxylic acid group-modified self-dispersible pigment. Examples of the commercially available product include "CAB-O-JET (trade name) 300" produced by Cabot Specialty Chemicals, "Aqua-Black (trade name) R162" and "Aqua-Black (trade name) R001" produced by Tokai Carbon Co., Ltd., etc. The water-based ink may contain a polymeric pigment dispersant; or it is allowable that the water-based ink does not contain any polymeric pigment dispersant. In a case that the water-based ink contains the polymeric pigment dispersant, it is preferable that the polymeric pigment dispersant is contained in the water-based ink in an amount to an extent not affecting the viscosity of the water-based ink. As described above, since the water-based ink of the present teaching uses the self-dispersible pigment as described above, there is not any problem of the increase in viscosity which would be otherwise caused by the polymeric pigment dispersant; and the water-based ink of the present teaching has excellent jetting (discharge) stability and excellent storage stability.

The solid content blending amount (pigment solid content) of the carboxylic acid group-modified self-dispersible pigment with respect to the entire amount (total amount) of the water-based ink is not particularly limited, and may be appropriately determined based on, for example, desired optical density or color (hue, tint), etc. The pigment solid content is, for example, 0.1% by weight to 20% by weight, is preferably 1% by weight to 15% by weight, and is more preferably 2% by weight to 10% by weight.

The colorant may include a pigment, a dye, etc. which is/are different from the carboxylic acid group-modified self-dispersible pigment, in addition to the carboxylic acid group-modified self-dispersible pigment.

The water is preferably ion-exchanged water or pure water (purified water). The blending amount of water (water ratio) with respect to the entire amount of the water-based ink is, for example, 10% by weight to 90% by weight, and is preferably 40% by weight to 80% by weight. The water ratio may be, for example, the balance of the ink, excluding the other components.

The water-soluble organic solvent includes, for example, a humectant which prevents the water-based ink from drying at an end of the nozzle in the ink jet head and/or a penetrant which adjusts the drying speed of the water-based ink on a recording medium.

The humectant is not particularly limited, and includes, for example, lower alcohols such as methyl alcohol, ethyl alcohol, n-propyl alcohol, isopropyl alcohol, n-butyl alcohol, sec-butyl alcohol, and tert-butyl alcohol; amides such as dimethylformamide and dimethylacetamide; ketones such as acetone; ketoalcohols (ketone alcohols) such as diacetone alcohol; ethers such as tetrahydrofuran and dioxane; polyvalent alcohols such as polyalkylene glycol, alkylene glycol, and glycerol; 2-pyrrolidone; N-methyl-2-pyrrolidone; and 1,3-dimethyl-2-imidazolidinone. The polyalkylene glycol is not limited, and includes, for example, polyethylene glycol and polypropylene glycol. The alkylene glycol is not limited, and includes, for example, ethylene glycol, propylene glycol, butylenes glycol, diethylene glycol, triethylene glycol, dipropylene glycol, tripropylene glycol, thiodiglycol, and hexylene glycol. It is allowable that only one type of the humectant as described above is used, or two or more types of the humectants are used in combination. Among the above-described humectants, it is preferable to use polyvalent alcohols such as alkylene glycol and glycerol.

The blending amount of the humectant with respect to the entire amount of the water-based ink is, for example, 0% by weight to 95% by weight, is preferably 5% by weight to 80% by weight, and is more preferably 5% by weight to 50% by weight.

The penetrant is not limited, and includes, for example, glycol ether. The glycol ether is not limited, and includes, for example, ethylene glycol methyl ether, ethylene glycol ethyl ether, ethylene glycol-n-propyl ether, diethylene glycol methyl ether, diethylene glycol ethyl ether, diethylene glycol-n-propyl ether, diethylene glycol-n-butyl ether, diethylene glycol-n-hexyl ether, triethylene glycol methyl ether, triethylene glycol ethyl ether, triethylene glycol-n-propyl ether, triethylene glycol-n-butyl ether, propylene glycol methyl ether, propylene glycol ethyl ether, propylene glycol-n-propyl ether, propylene glycol-n-butyl ether, dipropylene glycol methyl ether, dipropylene glycol ethyl ether, dipropylene glycol-n-propyl ether, dipropylene glycol-n-butyl ether, tripropylene glycol methyl ether, tripropylene glycol ethyl ether, tripropylene glycol-n-propyl ether, and tripropylene glycol-n-butyl ether. It is allowable that only one type of the penetrant as described above is used, or two or more types of the penetrants are used in combination.

The blending amount of the penetrant with respect to the entire amount of the water-based ink is, for example, 0% by weight to 20% by weight, is preferably 0.1% by weight to 15% by weight, and is more preferably 0.5% by weight to 10% by weight.

As described above, the water-based ink further contains a highly polymerized compound containing a carbodiimide group (carbodiimide group-containing highly polymerized compound) and an ether sulfate-based anionic surfactant. The carbodiimide group reacts with the carboxyl group. Therefore, when the carbodiimide group-containing highly polymerized compound and the carboxylic acid group-modified self-dispersible pigment are contained in a same water-based ink, then the pigment is cross-linked by the carbodiimide group-containing highly polymerized compound, which in turn causes the water-based ink to aggregate (coagulate). On the other hand, since the water-based ink of the present teaching contains the ether sulfate-based anionic surfactant, any aggregation is not occurred even when the carboxylic acid group-modified self-dispersible pigment and the carbodiimide group-containing highly polymerized compound are used together. The reason for this is not clear, but is considered that the ether sulfate-based anionic surfactant inhibits the reaction between the carboiimide group and the carboxyl group and the following mechanism is assumed. Namely, in the ink, the ether sulfate-based anionic surfactant adsorbs to the surface of the pigment and forms a protective layer protecting the carboxyl group existing on the surface of the pigment from the carbodiimide group. Due to the protective layer, the carbodiimide group and the carboxyl group are prevented from reacting to each other, thereby making it possible to prevent the aggregation of the ink. Further, after an image, etc. has been recorded on a glossy paper by using the water-based ink, the ether sulfate-based anionic surfactant is desorbed from the surface of the pigment and the above-described protective layer disappears. With this, the carboxylic acid group-modified self-dispersible pigment is cross-linked by the carbodiimide group-containing highly polymerized compound, resulting in enhancing the fixing property of the water-based pigment ink to the glossy paper. As described above, the water-based ink of the present teaching has excellent fixing property to glossy paper only with one liquid (water-based ink only), without using any pigment fixing agent. Furthermore, the water-based ink of the present teaching contains the ether sulfate-based anionic surfactant, and thus has excellent discharge property and excellent re-dispersion property.

The carbodiimide group-containing highly polymerized compound is exemplified by Carbodilite (trade name) V-02-L, V-02-L2, SV-02, V-02, V-04, E-01, E-02 produced by Nisshinbo Inc., etc. It is allowable to use, as the carbodiimide group-containing highly polymerized compound, those marketed in the form of emulsion in which the highly polymerized compound, as a particle, is dispersed. However, those in the form of aqueous solution in which the highly polymerized compound is dissolved are preferable in view of preventing the nozzles of the inkjet head from being clogged. It is allowable to use only one kind of the carbodiimide group-containing highly polymerized compound, or it is allowable to use two or more kinds of the carbodiimide group-containing highly polymerized compound together.

The blending amount of the carbodiimide group-containing highly polymerized compound (active-ingredient conversion rate) with respect to the entire amount of the water-based ink is, for example, 0.01% by weight to 10% by weight, is preferably 0.01% by weight to 1.0% by weight, and is more preferably 0.1% by weight to 1.0% by weight. Note that the term "active-ingredient conversion rate" means, for example, in a case that an aqueous solution of the carbodiimide group-containing highly polymerized compound is used, an amount of the carbodiimide group-containing highly polymerized compound itself, excluding the water.

The ether sulfate-based anionic surfactant is preferably an alkyl ether sulfate-based anionic surfactant, and is more preferably a polyoxyethylene alkyl ether sulfate-based anionic surfactant represented by the following formula (1). By using the polyoxyethylene alkyl ether sulfate-based anionic surfactant, it is possible to further improve the re-dispersion property.

[Formula 1]

$$R^1—O(CH_2CH_2O)_x—SO_3M \quad (1)$$

In the formula (1), $R^1$ is alkyl group. The carbon number of the alkyl group is in a range of 12 to 15. The alkyl group is a straight chain-alkyl group or a branched chain-alkyl group. In the formula (1), M is exemplified by $Na^+$ or $[NH(CH_2Ch_2OH)_3]^+$, etc. In the formula (1), x is a number that is 2 to 4. The alkyl group is exemplified by dodecyl group (carbon number 12), tridecyl group (carbon number 13), etc.

As the ether sulfate-based anionic surfactant, it is allowable to use, for example, a commercially available product. The commercially available product of the ether sulfate-based anionic surfactant is exemplified by sodium hexadecyl sulfate, sodium stearyl sulfate produced by Tokyo Chemical Industry, Co., Ltd., etc. The commercially available product of the polyoxyethylene alkyl ether sulfate-based anionic surfactant is exemplified by "SUNNOL (trade name) NL 1430" produced by Lion Corporation, "EMAL (trade name) 200" produced by Kao Corporation, etc. It is allowable to use only one kind of the ether sulfate-based anionic surfactant, or it is allowable to use two or more kinds of the ether sulfate-based anionic surfactant together.

The blending amount of the ether sulfate-based anionic surfactant (active-ingredient conversion rate) with respect to the entire amount of the water-based ink is, for example, 0.01% by weight to 5% by weight, and is preferably 0.05% by weight to 0.5% by weight. Note that the term "active-ingredient conversion rate" means, for example, in a case that an aqueous solution of the ether sulfate-based anionic surfactant is used, an amount of the ether sulfate-based anionic surfactant itself, excluding the water.

The water-based ink may further contain a conventionally known additive, if necessary. The additive includes, for example, pH-adjusting agents, viscosity-adjusting agents, surface tension-adjusting agents, and fungicides. The viscosity-adjusting agents include, for example, polyvinyl alcohol, cellulose, water-soluble resin, etc.

As described above, the water-based ink for ink-jet recording of the present teaching has excellent discharge property and excellent re-dispersion property, and has excellent fixing property to the glossy paper even without using any pigment fixing solution.

The water-based ink can be prepared, for example, such that the carboxylic acid group-modified self-dispersible pigment, water, a water-soluble organic solvent, the carbodiimide group-containing highly polymerized compound, the ether sulfate-based anionic surfactant, and optionally other additive component(s) as necessary are mixed uniformly or homogeneously by any conventionally known method, and by removing undissolved matters by a filter or the like. Note that, however, for preventing the reaction between the carboxylic acid group-modified self-dispersible pigment and the carbodiimide group-containing highly polymerized compound, these two components are need to be mixed in the presence of the ether sulfate-based anionic surfactant. For example, at first, a mixed liquid (mixed solution) is prepared, the mixed liquid containing the ether sulfate-based anionic surfactant and either one of the carboxylic acid group-modified self-dispersible pigment and the carbodiimide group-containing highly polymerized compound. Next, the other of the carboxylic acid group-modified self-dispersible pigment and the carbodiimide group-containing highly polymerized compound is added to the mixed liquid. Namely, in a case that the mixed liquid contains the ether sulfate-based anionic surfactant and the carboxylic acid group-modified self-dispersible pigment, the carbodiimide group-containing highly polymerized compound is added to the mixed liquid; in a case that the mixed liquid contains the ether sulfate-based anionic surfactant and the carbodiimide group-containing highly polymerized compound, the carboxylic acid group-modified self-dispersible pigment is added to the mixed liquid. An example of specific producing method of the water-based ink is as follows.

In a first producing method for producing the water-based ink, at first, the carboxylic acid group-modified self-dispersible pigment and the ether sulfate-based anionic surfactant are mixed uniformly to obtain a pigment dispersion. Subsequently, the carbodiimide group-containing highly polymerized compound and other component(s) are added to the pigment dispersion, and are mixed together uniformly to obtain mixture. Then, the obtained mixture is filtrated through a filter, thereby producing the water-based ink.

In a second producing method for producing the water-based ink, at first, components other than (different from) the carboxylic acid group-modified self-dispersible pigment are mixed uniformly to obtain an ink solvent. Subsequently, a water dispersion of the carboxylic acid group-modified self-dispersible pigment is added to the ink solvent, and are mixed together uniformly to obtain mixture. Then, the obtained mixture is filtrated through a filter, thereby producing the water-based ink.

Next, an explanation will be given about an ink cartridge of the present teaching. The ink cartridge of the present teaching is an ink cartridge including a water-based ink for ink jet recording wherein the water-based ink is the water-based ink for ink-jet recording of the present teaching. It is allowable to use, for example, a conventionally known body for ink cartridge as the body of the ink cartridge.

Next, explanation will be given about an ink-jet recording method and an ink-jet recording apparatus of the present teaching.

The ink-jet recording method of the present teaching is an ink-jet recording method for performing recording on a recording medium by discharging (jetting) a water-based ink by the ink-jet system, wherein the water-based ink for ink-jet recording of the present teaching is used as the water-based ink.

The ink-jet recording apparatus of the present teaching is an ink-jet recording apparatus including an ink accommodating section which accommodates an ink; and an ink-jet discharge mechanism which discharges the ink accommodated in the ink accommodating section, wherein the cartridge of the present teaching is accommodated in the ink accommodating section.

The ink-jet recording method of the present teaching can be practiced by, for example, using the ink-jet recording apparatus of the present teaching. The recording includes printing text (character, letter), printing image or picture, and printing, etc.

As shown in FIG. 1, an ink-jet recording apparatus 1, as an example of the ink-jet recording apparatus of the present teaching, includes four ink cartridges 2, an ink discharge mechanism (ink-jet head) 3, a head unit 4, a carriage 5, a driving unit 6, a platen roller 7 and a purge device 8 as main constitutive components or parts.

The four ink cartridges 2 contain four colors of water-based inks respectively, the four colors being black, yellow, magenta and cyan. For example, the water-based black ink is the water-based ink of the preset teaching, and an ink cartridge, among the cartridges, which contains the water-based black ink is the ink cartridge of the present teaching. It is allowable to use commercially available water inks as the remaining inks other than the water-based black ink. The ink-jet head 3 disposed on the head unit 4 performs recording on a recording medium (for example, recording sheet or recording paper) P. The four ink cartridges 2 and the head unit 4 are provided or arranged on the carriage 5. The driving unit 6 reciprocates the carriage 5 in a linear direction. As the driving unit 6, it is possible to use, for example, a conventionally known driving unit (see, for example, Japanese Patent Application laid-open No. 2008-246821). The platen roller 7 extends in the reciprocating direction of the carriage 5 and is arranged to face or be opposite to the ink-jet head 3.

The recording paper P is supplied or fed, for example, from a paper feeding cassette or sheet feeding cassette (not shown) arranged at a side of or at a position below the ink-jet recording apparatus 1. The recording paper P is introduced or guided between the ink-jet head 3 and the platen roller 7. Then, a predetermined recording is performed on the fed or introduced recording paper P with the ink(s) discharged or jetted from the ink-jet head 3. Afterwards, the recording paper P on which the recording has been performed is discharged from the ink-jet recording apparatus 1. In FIG. 1, a paper feeding mechanism and a discharging mechanism for the recording paper P are omitted.

The purge device 8 sucks or draws unsatisfactory ink (poor ink) which contains air bubbles, etc. accumulated or trapped in the ink-jet head 3. As the purge device 8, it is possible to use, for example, a conventionally known purge device (for example, see Japanese Patent Application laid-open No. 2008-246821).

A wiper member 20 is provided on the purge device 8, on the side of the platen roller 7 such that the wiper member 20 is adjacent to the purge device 8. The wiper member 20 is formed to have a spatula form, and wipes a nozzle-formed surface of the ink-jet head 3 accompanying with the movement (reciprocating movement) of the carriage 5. In FIG. 1, a cap 18 is provided to cover a plurality of nozzles of the ink-jet head 3 which is returned to a reset position upon completion of the printing, so as to prevent the ink from drying.

In the ink-jet recording apparatus, the four ink cartridges may be provided on a plurality of carriages. Alternatively, the ink cartridges may be arranged and fixed inside the ink-jet recording apparatus, rather than being provided on the carriage(s). In such an aspect, for example, the ink cartridges and the head unit which is provided on the carriage are connected with a tube, etc., and the inks are supplied from the ink cartridges to the head unit via the tube.

EXAMPLES

Next, examples of the present teaching will be explained together with comparative examples. Note that the present teaching is not limited and is not restricted to the examples and the comparative examples which will be described below.

Examples 1-7 and Comparative Examples 1-13

Components except for a water dispersion of self-dispersible carbon black (self-dispersible carbon black water dispersion), which were included in the water-based ink composition (TABLE 1), were mixed uniformly or homogeneously to obtain ink solvents. Subsequently, the ink solvents were each added to the self-dispersible carbon black water dispersion, followed by being mixed uniformly. After that, obtained mixtures were each filtrated through a cellulose acetate membrane filter (pore size 3.00 μm) produced by Toyo Roshi Kaisha, Ltd., and thus water-based ink for ink-jet recording of Examples 1-7 and Comparative Examples 1-13 were obtained.

The water-based inks of Examples 1-7 and Comparative Examples 1-13 were subjected to (a) discharge property evaluation, (b) re-dispersion property evaluation and (c) fixing property to glossy paper evaluation, with the following method.

(a) Discharge Property Evaluation

A digital multifunction machine DCP-385C provided with an ink-jet printer produced by Brother Industries, Ltd. was used to continuously perform 20 recordings (recording on 20 sheets of recording paper or medium) of an image including a single-color black patch with the water-based ink of Examples 1-7 and Comparative Examples 1-13, and the discharge property was evaluated in accordance with the following evaluation criterion.

Evaluation Criterion for Discharge Property:

AA: No missing print (missing print portion) were present in all the 20 sheets.

A: Missing print was present in 1 to 3 pieces of the 20 sheets.

B: Missing print was present in not less than 4 pieces of the 20 sheets.

(b) Re-Dispersion Property Evaluation

The water-based ink of Examples 1-7 and Comparative Examples 1-13 were dripped each in an amount of 10 μL onto preparations, respectively. Subsequently, the preparations were stored for duration of one day under an environment of temperature: 60° C. and relative humidity: 40%, and thus the water-based inks were evaporated and dried. Next, a pure water was dripped, in an amount of 1 mL, onto each of the solid matters obtained after the storage. With respect to the evaluation samples prepared in such a manner, presence or absence of coarse particles and/or foreign matter(s) was observed by using a ×200-magnification optical microscope. The re-dispersion property was evaluated in accordance with the following evaluation criterion.

Evaluation Criterion for Re-Dispersion Property:

AA: After dripping of the pure water, the solid matter was immediately re-dispersed (dissolved and dispersed in the pure water), and any coarse particles and/or foreign matter were not present.

A: Although some time was required for the solid matter to be re-dispersed, any coarse particles and/or foreign matter were not present.

B: Coarse particles and/or foreign matter were present.

(c) Fixing Property Evaluation to Glossy Paper

The digital multifunction machine DCP-385C provided with the ink-jet printer was used to record an image including a single-color black patch with the water-based inks of Examples 1-7 and Comparative Examples 1-13, at a resolution of 600 dpi×600 dpi, on a glossy paper (special paper that is photo glossy paper BP71GA produced by Brother Industries), and evaluation samples were prepared. Then, recording portions of the evaluation samples were rubbed by cotton swabs. Subsequently, the rubbed portions of the evaluation samples were visually observed in accordance with the following evaluation criterion.

Evaluation Criterion for Fixing Property to Glossy Paper:

G: Any scrape (scratch) was not present in the rubbed portion.

NG: Scrape was present in the rubbed portion.

The compositions of the water-based inks of Examples 1-7 and Comparative Examples 1-13 and the measurement/evaluation results therefor are shown in TABLE 1.

TABLE 1

| | | EXAMPLES | | | | | | |
|---|---|---|---|---|---|---|---|---|
| | | EX. 1 | EX. 2 | EX. 3 | EX 4 | EX. 5 | EX. 6 | EX. 7 |
| Composition of water-based ink (% by weight) | CAB-O-JET (trade name) 300 (*1) | 26.66 (4.0) | 26.66 (4.0) | 26.66 (4.0) | 26.66 (4.0) | 26.66 (4.0) | 26.66 (4.0) | 26.66 (4.0) |
| | CAB-O-JET (trade name) 200 (*2) | — | — | — | — | — | — | — |
| | Glycerol (*3) | 23.00 | 23.00 | 23.00 | 23.00 | 23.00 | 23.00 | 23.00 |
| | Dipropylene glycol-n-propyl ether | 2.00 | 2.00 | 2.00 | 2.00 | 2.00 | 2.00 | 2.00 |
| Ether sulfate-based anionic surfactant | SUNNOL (trade name) NL-1430 (*4) | 0.20 (0.05) | — | — | 0.20 (0.05) | 0.20 (0.05) | 0.20 (0.05) | 2.00 (0.50) |
| | EMUL (trade name) 20C (*5) | — | 0.20 (0.05) | — | — | — | — | — |
| | Sodium hexadecyl sulfate (60%) (*6) Sodium stearyl sulfate (40%) (*7) | — | — | 0.05 | — | — | — | — |
| Surfactant | Sodium 1-dodecanesulfonate | — | — | — | — | — | — | — |
| | Sodium benzensulfonate (*8) | — | — | — | — | — | — | — |
| | NEOPELEX (trade name) G-15 (*9) | — | — | — | — | — | — | — |
| | Sodium laurate (*10) | — | — | — | — | — | — | — |
| | ORFIN (trade name) E1010 (*11) | — | — | — | — | — | 0.10 | — |
| | Carbodilite (trade name) V-02-L (*12) | 0.25 (0.10) | 0.25 (0.10) | 0.25 (0.10) | 1.25 (0.50) | 2.50 (1.00) | 0.25 (0.10) | 2.50 (1.00) |
| Water-soluble highly polymerized compound | PVA-220 (10% water solution) (*13) | — | — | — | — | — | — | — |
| | PVA-203 (10% water solution) (*14) | — | — | — | — | — | — | — |
| | AQUALIC (trade name) L DL-40 (*15) | — | — | — | — | — | — | — |
| | AQUALIC (trade name) L TL-37 (*16) | — | — | — | — | — | — | — |
| | Water | balance | balance | balance | balance | balance | balance | balance |
| Evaluations | Discharge property evaluation | AA | AA | AA | AA | A | AA | AA |
| | Re-dispersion property evaluation | AA | AA | A | AA | A | AA | AA |
| | Fixing property to glossy paper evaluation | G | G | G | G | G | G | G |

| | | COMPARATIVE EXAMPLES | | | | | | |
|---|---|---|---|---|---|---|---|---|
| | | COM. EX. 1 | COM. EX. 2 | COM. EX. 3 | COM. EX 4 | COM. EX. 5 | COM. EX. 6 | COM. EX. 7 |
| Composition of water-based ink (% by weight) | CAB-O-JET (trade name) 300 (*1) | 26.66 (4.0) | 26.66 (4.0) | 26.66 (4.0) | 26.66 (4.0) | 26.66 (4.0) | 26.66 (4.0) | 26.66 (4.0) |
| | CAB-O-JET (trade name) 200 (*2) | — | — | — | — | — | — | — |
| | Glycerol (*3) | 23.00 | 23.00 | 23.00 | 23.00 | 23.00 | 23.00 | 23.00 |
| | Dipropylene glycol-n-propyl ether | 2.00 | 2.00 | 2.00 | 2.00 | 2.00 | 2.00 | 2.00 |
| Ether sulfate-based anionic surfactant | SUNNOL (trade name) NL-1430 (*4) | 0.20 (0.05) | — | — | — | — | — | 0.20 (0.05) |
| | EMUL (trade name) 20C (*5) | — | — | — | — | — | — | — |
| | Sodium hexadecyl sulfate (60%) (*6) Sodium stearyl sulfate (40%) (*7) | — | — | — | — | — | — | — |
| Surfactant | Sodium 1-dodecanesulfonate | — | 0.05 | — | — | — | — | — |
| | Sodium benzensulfonate (*8) | — | — | 0.05 | — | — | — | — |
| | NEOPELEX (trade name) G-15 (*9) | — | — | — | 0.20 (0.05) | — | — | — |
| | Sodium laurate (*10) | — | — | — | — | 0.05 | — | — |
| | ORFIN (trade name) E1010 (*11) | — | — | — | — | — | 0.10 | — |
| | Carbodilite (trade name) V-02-L (*12) | — | 0.25 (0.10) | 0.25 (0.10) | 0.25 (0.10) | 0.25 (0.10) | 0.25 (0.10) | — |
| Water-soluble highly polymerized compound | PVA-220 (10% water solution) (*13) | — | — | — | — | — | — | 1.00 (0.10) |
| | PVA-203 (10% water solution) (*14) | — | — | — | — | — | — | — |
| | AQUALIC (trade name) L DL-40 (*15) | — | — | — | — | — | — | — |
| | AQUALIC (trade name) L TL-37 (*16) | — | — | — | — | — | — | — |
| | Water | balance | balance | balance | balance | balance | balance | balance |
| Evaluations | Discharge property evaluation | AA | N/A | N/A | N/A | N/A | N/A | N/A |
| | Re-dispersion property evaluation | AA | N/A | N/A | N/A | N/A | N/A | N/A |
| | Fixing property to glossy paper evaluation | NG | N/A | N/A | N/A | N/A | N/A | N/A |

| | | COMPARATIVE EXAMPLES | | | | | |
|---|---|---|---|---|---|---|---|
| | | COM. EX. 8 | COM. EX. 9 | COM. EX. 10 | COM. EX 11 | COM. EX. 12 | COM. EX. 13 |
| Composition of water-based ink (% by weight) | CAB-O-JET (trade name) 300 (*1) | 26.66 (4.0) | 26.66 (4.0) | 26.66 (4.0) | 26.66 (4.0) | — | — |
| | CAB-O-JET (trade name) 200 (*2) | — | — | — | — | 20.00 (4.0) | 20.00 (4.0) |
| | Glycerol (*3) | 23.00 | 23.00 | 23.00 | 23.00 | 23.00 | 23.00 |
| | Dipropylene glycol-n-propyl ether | 2.00 | 2.00 | 2.00 | 2.00 | 2.00 | 2.00 |

TABLE 1-continued

|  |  |  |  |  |  |  |  |  |
|---|---|---|---|---|---|---|---|---|
|  | Ether sulfate-based anionic surfactant | SUNNOL (trade name) NL-1430 (*4) | 0.20 (0.05) | 0.20 (0.05) | 0.20 (0.05) | 0.20 (0.05) | 0.20 (0.05) | 0.20 (0.05) |
|  |  | EMUL (trade name) 20C (*5) | — | — | — | — | — | — |
|  |  | Sodium hexadecyl sulfate (60%) (*6) |  |  |  |  |  |  |
|  |  | Sodium stearyl sulfate (40%) (*7) |  |  |  |  |  |  |
|  | Surfactant | Sodium 1-dodecanesulfonate | — | — | — | — | — | — |
|  |  | Sodium benzensulfonate (*8) | — | — | — | — | — | — |
|  |  | NEOPELEX (trade name) G-15 (*9) | — | — | — | — | — | — |
|  |  | Sodium laurate (*10) | — | — | — | — | — | — |
|  |  | ORFIN (trade name) E1010 (*11) | — | — | — | — | — | — |
|  | Carbodilite (trade name) V-02-L (*12) |  | — | — | — | — | 0.25 (0.10) | 2.50 (1.00) |
|  | Water-soluble highly polymerized compound | PVA-220 (10% water solution) (*13) | — | — | — | — | — | — |
|  |  | PVA-203 (10% water solution) (*14) | 0.50 (0.05) | 5.00 (0.50) | — | — | — | — |
|  |  | AQUALIC (trade name) L DL-40 (*15) | — | — | 0.25 (0.10) | — | — | — |
|  |  | AQUALIC (trade name) L TL-37 (*16) | — | — | — | 0.28 (0.10) | — | — |
|  | Water |  | balance | balance | balance | balance | balance | balance |
| Evaluations | Discharge property evaluation |  | AA | A | A | A | AA | A |
|  | Re-dispersion property evaluation |  | A | B | B | B | A | B |
|  | Fixing property to glossy paper evaluation |  | NG | G | G | G | NG | NG |

Note that in Table 1:
(*1): Water dispersion of self-dispersible carbon black modified by carboxylic acid group, produced by Cabot, carbon black concentration = 15% by weight (parenthesized numerals indicate pigment solid content amounts).
(*2): Water dispersion of self-dispersible carbon black modified by sulfonate group, produced by Cabot, carbon black concentration = 20% by weight (parenthesized numerals indicate pigment solid content amounts).
(*3): Produced by Kanto Chemical Co., Inc.
(*4): Sodium polyoxyethylene (3 E.O.) alkyl (C = 12, 13) ether sulfate, produced by Lion Corporation, active ingredient amount = 28% by weight (parenthesized numerals indicate active ingredient amounts).
(*5): Sodium polyoxyethylene (3 E.O.) lauryl ether sulfate, produced by Kao Corporation, active ingredient amount = 25% by weight (parenthesized numerals indicate active ingredient amounts).
(*6), (*7), (*8), (*10): Produced by Tokyo Chemical Industry, Co., Ltd.
(*9): Sodium dodecylbenzene sulfonate, produced by Kao Corporation, active ingredient amount = 25% by weight (parenthesized numerals indicate active ingredient amounts).
(*11): Acetylene glycol-based surfactant (ethylene oxide (10 mol) adduct of acetylene diol), produced by Nissin Chemical Industry Co., Ltd.
(*12): Carbodiimide group-containing highly polymerized compound, produced by Nissinbo Co., Ltd., active ingredient amount = 40% by weight (parenthesized numerals indicate active ingredient amounts).
(*13), (*14): Produced by Kuraray Co., Ltd., (parenthesized numerals indicate active ingredient amounts).
(*15): Sodium polyacrylate, produced by Nippon Shokubai, Co., Ltd., active ingredient amount = 40% by weight (parenthesized numerals indicate active ingredient amounts).
(*16): Salt of acrylic-maleic acid copolymer, produced by Nippon Shokubai, Co., Ltd., active ingredient amount = 37% by weight (parenthesized numerals indicate active ingredient amounts).

As shown in TABLE 1, the water-based ink of Examples 1 to 7 showed excellent results in all of the discharge property evaluation, re-dispersion property evaluation, and fixing property to glossy paper evaluation. In particular, Examples 1, 2, 4, 6 and 7 which used the anionic surfactant based on polyoxyethylene alkyl ether sulfate showed excellent results "AA" in the re-dispersion property evaluation. On the other hand, in the ink of Example 3 not using the anionic surfactant based on polyoxyethylene alkyl ether sulfate showed a result of "A" which is somewhat low as compared with the above-described results of Examples 1, 2, 4, 6 and 7. From these results, it was appreciated that the anionic surfactant based on polyoxyethylene alkyl ether sulfate was particularly effective, among the ether sulfate-based anionic surfactant, for the re-dispersion property of the water-based ink.

Further, in Examples 4 and 5, the blending amount of the carbodiimide group-containing highly polymerized compound (Carbodilite (trade name) V-02-L) was increased by five times and ten times, respectively, of that of Example 1. As a result, Example 4 showed the results of discharge property evaluation and re-dispersion property evaluation of "AA" which were same as those of Example 1, but Example 5 showed the results of discharge property evaluation and re-dispersion property evaluation of "A" which were somewhat low as compared with those of Example 1. Furthermore, in Example 7, the blending amount of the ether sulfate-based anionic surfactant as well as the blending amount the carbodiimide group-containing highly polymerized compound were increase by ten times of those in Example 1, the results of discharge property evaluation and re-dispersion property evaluation were improved to "AA". From these results, the following points can be assumed. Namely, in Example 5, the blending amount of the carbodiimide group-containing highly polymerized compound was great with respect to the blending amount of the ether sulfate-based anionic surfactant inhibiting the reaction between the pigment and the carbodiimide group-containing highly polymerized compound; and it is considered that in the ink the reaction was advanced between the pigment and the carbodiimide group-containing highly polymerized compound. Consequently, it is assumed that in Example 5, the results of discharge property evaluation and re-dispersion property evaluation were somewhat low as compared with those in Example 1. Further, in Example 7, since the blending amount of the ether sulfate-based anionic surfactant was increased; and it is considered that in the ink the reaction between the pigment and the carbodiimide group-containing highly polymerized compound was inhibited by the ether sulfate-based anionic surfactant. Consequently, it is assumed that in Example 7, the results of discharge property evaluation and re-dispersion property evaluation were improved.

On the other hand, the water-based ink of Comparative Example 1, which did not use any carbodiimide group-containing highly polymerized compound showed inferior results in the fixing property to glossy paper evaluation. In Comparative Example 1, it is considered that since the cross-linking reaction of the pigment did not occur after the image had been recorded on the glossy paper by using the water-based ink, and thus the result of fixing property to glossy paper evaluation was inferior.

Further, in the water-based inks of Comparative Examples 2-6 which did not use any ether sulfate-based anionic surfactant, aggregation was caused in each of the inks and thus it was impossible to perform the discharge property evaluation, the re-dispersion property evaluation and the fixing property to glossy paper evaluation therefor. It is considered that the surfactant which was used in each of Comparative Examples 2 to 6 and which was not the ether sulfate-based anionic surfactant could not inhibit the reaction between the pigment and the carbodiimide group-containing highly polymerized compound. Consequently, it is assumed that in Comparative Examples 2-6, the aggregation of the ink occurred.

Furthermore, the water-based inks of Comparative Examples 7-11 which used the water-soluble highly polymerized compound other than the carbodiimide-group containing highly polymerized compound showed inferior results in the fixing property to glossy paper evaluation when the blending amount of the water-soluble highly polymerized compound was small and showed inferior results in the re-dispersion property evaluation when the blending amount of the water-soluble highly polymerized compound was great. As described above, the water-based inks of Comparative Examples 7 to 11, each of which used the water-soluble highly polymerized compound other than the carbodiimide-group containing highly polymerized compound, could not satisfy all of the discharge property, re-dispersion property, and fixing property to glossy paper for the water-based ink.

Moreover, the water-based inks of Comparative Examples 12 and 13 each of which used the self-dispersible pigment modified by sulfonate group, instead of using the self-dispersible pigment modified by carbodiimide group, showed inferior results in the fixing property to glossy paper evaluation. Since the sulfonate group does not react with the carbodiimide group, it is considered that in Comparative Examples 12 and 13 any cross-linking reaction of the self-dispersible pigment modified by the sulfonate group did not occurred; and it is assumed that the water-based ink of Comparative Examples 12 and 13 showed the inferior results of the fixing property to glossy paper evaluation.

As describe above, the water-based ink of the present teaching has excellent discharge property and excellent re-dispersion property, and has excellent fixing property to glossy paper, even without using any pigment fixing solution. The usage of water-based ink of the present teaching is not particular limited; and the water-based ink is widely applicable to a variety of kinds of ink-jet recording.

What is claimed is:

1. A water-based ink for ink jet recording comprising:
    a colorant including a self-dispersible pigment modified by a carboxylic acid group;
    a highly polymerized compound containing a carbodiimide group;
    an ether sulfate-based anionic surfactant;
    water; and
    a water-soluble organic solvent,
    wherein a blending amount of the highly polymerized compound containing the carbodiimide group with respect to an entire amount of the water-based ink is from 0.1% to 0.5% by weight.

2. The water-based ink for ink jet recording according to claim 1, wherein the ether sulfate-based anionic surfactant is an alkyl ether sulfate-based anionic surfactant.

3. The water-based ink for ink jet recording according to claim 1, wherein the ether sulfate-based anionic surfactant contains a polyoxyethylene structure.

4. An ink cartridge comprising a water-based ink for ink jet recording, wherein the water-based ink for ink jet recording is the water-based ink for ink-jet recording as defined in claim 1.

5. The ink cartridge according to claim 4, wherein the water-based ink for ink-jet recording is a water-based black ink.

6. An ink jet recording apparatus comprising:
    an ink accommodating section which accommodates the ink cartridge as defined in claim 4; and
    an ink discharge mechanism which discharges the ink included in the ink cartridge.

7. A method for producing a water-based ink for ink jet recording which includes a colorant including a self-dispersible pigment modified by a carboxylic acid group; a highly polymerized compound containing a carbodiimide group; an ether sulfate-based anionic surfactant; water; and a water-soluble organic solvent, the method comprising:
    preparing a mixed liquid containing the ether sulfate-based anionic surfactant and one of the self-dispersible pigment modified by the carboxylic acid group and the highly polymerized compound containing the carbodiimide group; and
    adding, to the mixed liquid, the other of the self-dispersible pigment modified by the carboxylic acid group and the highly polymerized compound containing the carbodiimide group,
    wherein a blending amount of the highly polymerized compound containing the carbodiimide group with respect to an entire amount of the water-based ink is from 0.1% to 0.5% by weight.

8. The water-based ink for ink jet recording according to claim 1, wherein a blending amount of the ether sulfate-based anionic surfactant with respect to an entire amount of the water-based ink is from 0.05% to 0.5% by weight.

* * * * *